(12) United States Patent
Wycherley et al.

(10) Patent No.: US 6,898,283 B2
(45) Date of Patent: May 24, 2005

(54) EXCHANGABLE HOUSING COVER FOR A PORTABLE RADIO COMMUNICATION DEVICE

(75) Inventors: Mark Wycherley, Camberley (GB); Dominic Lobo, Farnham (GB); Kalevi Kaartinen, Erkrath (DE)

(73) Assignee: Nokia Mobile Phones Ltd., Espoo (FI)

( * ) Notice: Subject to any disclaimer, the term of this patent is extended or adjusted under 35 U.S.C. 154(b) by 631 days.

(21) Appl. No.: 09/829,764

(22) Filed: Apr. 10, 2001

(65) Prior Publication Data

US 2002/0030103 A1 Mar. 14, 2002

(30) Foreign Application Priority Data

May 5, 2000 (GB) ............................................. 0010937
Dec. 8, 2000 (GB) ............................................. 0030048

(51) Int. Cl.⁷ ............................................. H04M 1/00
(52) U.S. Cl. ............................ 379/433.11; 379/428.01; 379/433.01; 379/447; 455/90.3; 455/418; 455/550.1; 455/575.1; 455/575.8
(58) Field of Search ............................ 455/575.1, 418, 455/550.1, 575.3, 575.4, 575.8, 90.3; 379/428.01, 433.01, 433.11, 447, 433; D14/138, 248, 250; 345/87, 905

(56) References Cited

U.S. PATENT DOCUMENTS

| | | | |
|---|---|---|---|
| 5,023,936 A | | 6/1991 | Szczutkowski et al. |
| 5,077,832 A | | 12/1991 | Szczutkowski et al. |
| 5,848,152 A | * | 12/1998 | Slipy et al. ............. 379/433.13 |
| 5,911,121 A | * | 6/1999 | Andrews ..................... 455/418 |
| 6,104,168 A | * | 8/2000 | Aranovich ................... 320/136 |
| 6,285,891 B1 | * | 9/2001 | Hoshino ..................... 455/567 |
| 6,356,543 B2 | * | 3/2002 | Hall et al. ................... 370/352 |

FOREIGN PATENT DOCUMENTS

| | | |
|---|---|---|
| CN | 1220060 A | 6/1999 |
| GB | 2355126 A | 4/2001 |
| WO | WO 97/44912 | 11/1997 |
| WO | WO 02/093956 | 11/2002 |

OTHER PUBLICATIONS

Wildseed Smart Skin Intelligent Faceplates, Smartskin Product Bulletin, 2002, Wildseed Ltd.

* cited by examiner

*Primary Examiner*—Nay Maung
*Assistant Examiner*—Raymond S Dean
(74) *Attorney, Agent, or Firm*—Steven A. Shaw

(57) ABSTRACT

The present invention relates to a removable housing cover that is adapted to be detachably connectable to a mobile phone. The removable cover having a distinguishing identity means associated therewith, and the phone having a sensor for sensing the distinguishing identity means of the removable cover and a processor controlling the operating characteristics of the device. The arrangement being such that in use, the removable housing cover is mounted on the phone and the sensor senses the identity means and outputs a sensed parameter of the identity means to the processor; wherein, the processor is responsive to the sensed parameter to change selected ones of the operating characteristics of the phone. In this way, changing the phone cover causes a change in the internal operating characteristics of the phone.

9 Claims, 1 Drawing Sheet

EXCHANGABLE HOUSING COVER FOR A PORTABLE RADIO COMMUNICATION DEVICE

CROSS-REFERENCE TO RELATED APPLICATIONS

This application claims the benefit under 35 U.S.C. Section 119 of United Kingdom application entitled REMOVABLE HOUSING COVER FOR A PORTABLE RADIO COMMUNICATION DEVICE, filed on May 5, 2000, assigned United Kingdom Application Number 0010937.1 and United Kingdom application entitled REMOVABLE HOUSING COVER FOR A PORTABLE RADIO COMMUNICATION DEVICE, filed on Dec. 8, 2000, assigned United Kingdom Application Number 0030048.3. Said patent applications are commonly assigned to assignee of the present invention and are incorporated herein by reference.

BACKGROUND

The present invention relates to a portable radio communication device, and more particularly to a portable radio communication device and a removable cover therefor.

Removable covers, such as that disclosed in the Applicant's United Kingdom Patent Number 2, 324, 929, afford end-users of a mobile phone disclosed in the said patent application the facility to swap the front housing cover of the mobile phone with a different front cover housing selected by the users as they wish. In this way, the end-users are empowered and advantageously, without necessitating the use of a tool, to replace the housing cover if they wish to change the appearance of the mobile phone, or to substitute a broken or scratched housing cover. In both cases, the replacement may be made without having to employ the services of a skilled technician.

SUMMARY

Against this background, the present invention provides a removable housing cover adapted to be detachably connectable to a portable radio communication device. The removable cover has an identity means associated therewith, and the portable radio communication device has a sensor for sensing the identity means of the removable cover and a processor for controlling the operating characteristics of the device. The arrangement being such that, in use, the removable housing cover may be mounted on the portable radio communication device and the sensor senses the identity means and outputs a sensed parameter of the identity means to the processor. The processor is responsive to the sensed parameter so as to change selected ones of the operating characteristics of the portable radio communication device.

Expressed alternately, an embodiment of the present invention resides in a removable housing cover for a portable radio communication device. The removable housing cover has associated therewith certain operating characteristics of the portable radio communication device. Wherein, when the removable cover is attached to the portable radio communication device, the removable cover is adapted to reconfigure the operating characteristics of the portable radio communication device in accordance with the operating characteristics associated with the removable cover.

Another embodiment of the present invention provides a housing cover for a portable radio communication device. The housing cover being adapted to be removably detachable with respect to the portable radio communication device. The portable radio communication device has a sensor and the housing cover has an identity means associated therewith, such that, when the housing cover is mounted on the portable radio communication device, the identity means is coupled with the sensor of the portable radio communication; whereby, the internal functionality of the portable radio communication device is dependent on the identity means.

In addition, a further embodiment of the present invention comprises a portable radio communication device having a removable housing cover. The portable radio communication device comprises a sensor and a processor for controlling the operating characteristics of the device and the removable housing cover comprises an identity means. The removable housing cover may be configured to be mounted on and attached to the portable radio communication device, in which arrangement the sensor of the portable radio communication device is operable to sense the identity means of the removable housing cover and provide an input to the processor of a sensed feature of the identity means, such that the processor is controlled to alter one or more of the operating characteristics in accordance with the sensed feature of the identity means.

By means of the embodiments of the present invention, the users of the portable radio communication device are able not only to change the outward appearance of the phone, but also to alter certain operating characteristics of the device, both being made possible by simply replacing one housing cover mounted on the phone with another different housing cover. That is to say, different removable housing covers have different portable radio communication device operating characteristics associated therewith, and by replacing covers, the user may change the operating characteristics of the portable radio communication device in line with the new replaceable housing cover. This leads to an increased sense of personalization and customization of a user's portable radio communication device.

In a preferred embodiment, there may be a consistent link or theme shared between the removable cover and the configuration software associated with the cover. In this way, the "personality" of the mobile phone may be completely changed from housing cover to housing cover, because the housing cover and configuration software together combine to impart to the phone an integrated, unitary user interface. In short, the invention allows the ability to associate aspects of the operating characteristics of the phone such as sounds and/or graphics with different phone covers.

In general terms, the approach taken in the present invention is as follows. The removable housing cover is provided with some form of identity means in the form of a distinguishing identity feature. When the user wishes to change the user interface he/she removes the housing cover currently attached to the phone, for example, by using the releasable attachment means described in the Applicant's patent referenced above, the releasable attachment aspects of which are incorporated herein by reference. Then the new housing cover that the user wishes to install onto the phone is located onto the phone and secured in position, again making use of the releasable attachment means. Once in place, the distinguishing identity feature of the removable housing cover comes into registration with a sensor reader provided on the phone. When the sensor reads the distinguishing identity feature of the removable housing cover (for instance when the phone is powered up, or simply when the phone detects a change of cover), a signal is passed to the phone's processor indicative of the sensed distinguishing identity feature of the new removable cover. The phone's processor is configured to receive and process the sensed signal and thereby control the operating characteristics of the phone to be altered in agreement with the distinguishing identity feature of the removable housing cover.

For instance, a user may purchase a new removable housing cover of his/her favorite musical band. The removable housing cover may have graphics associated with the band printed on the cover's outward surface, such as the band's logo. Mounting the new removable cover on his phone thus changes the look of the phone to depict the user's favorite musical band. On connecting the new removable housing cover to the phone, the phone is enabled with the ability to alter various operating characteristics thereof in line with aspects related to the musical band, e.g. the start-up menu may now have the band's logo or the ring tone may now jingle along with one of the band's songs. The user interface is thereby fully adapted to reflect the user's musical tastes and presents an integrated and unitary visual and operational interface of the musical band.

BRIEF DESCRIPTION OF THE DRAWINGS

In order to aid a more detailed understanding of the present invention, various embodiments of the invention will now be described. These should not be construed as necessarily limiting the invention but merely as examples of specific ways of putting the embodiments of the invention into effect. In particular, embodiments of the invention will be described with reference to the accompanying drawings in which.

DETAILED DESCRIPTION

Figure 1:
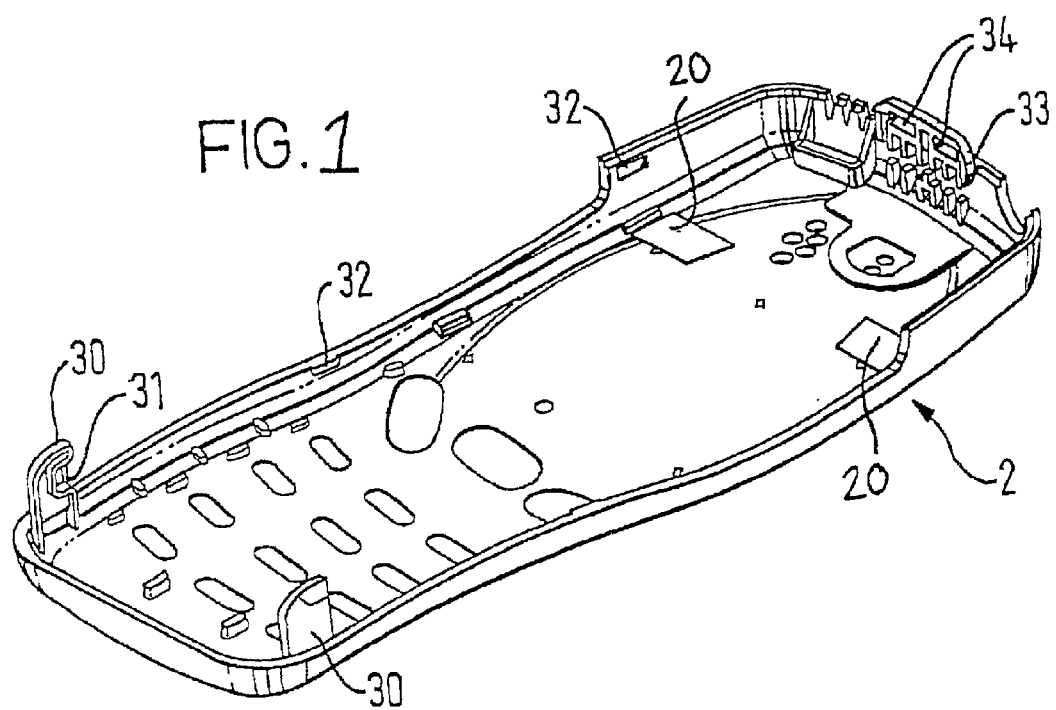
FIG. 1 is a perspective view of the reverse side of a removable cover of an embodiment of the present invention.

FIG. 1 shows an embodiment of the present invention in the form of a removable cover 2 for a mobile phone. The removable cover 2 has graphics and other indicia printed on its outward-facing surface. In this embodiment, the removable cover 2 is the front cover of the mobile phone. Of course, in other embodiments the removable cover may be the back cover of the phone. For complete visual subscription to a particular theme, both the front and back covers could be removably attachable to the mobile phone, in which case both front and back covers could carry graphics or other visual indications relating the particular theme in question. These could be removably attachable to the phone in the manner disclosed in Applicant's pending patent application number GB 9903260.9, assigned to the assignee of the present application and incorporated herein by reference. The releasable attachment aspects comprise complementary inter-engaging connection elements shown in FIGS. 1 and 2 numbered 30 to 34 and 27 to 29. In this way, the appearance of the whole phone would reflect the theme.

The removable cover is provided with an identity means in the form of distinguishing identity feature. In one form, the distinguishing identity feature consists in a memory chip patch that carries data associated with the particular removable cover. Other forms for the distinguishing identity feature will be described later. The memory chip is embedded during manufacture in the inside surface of the removable cover as illustrated in FIG. 1 at reference numerals 20; there may be two of these as illustrated, or more, or just one.

Figure 2:
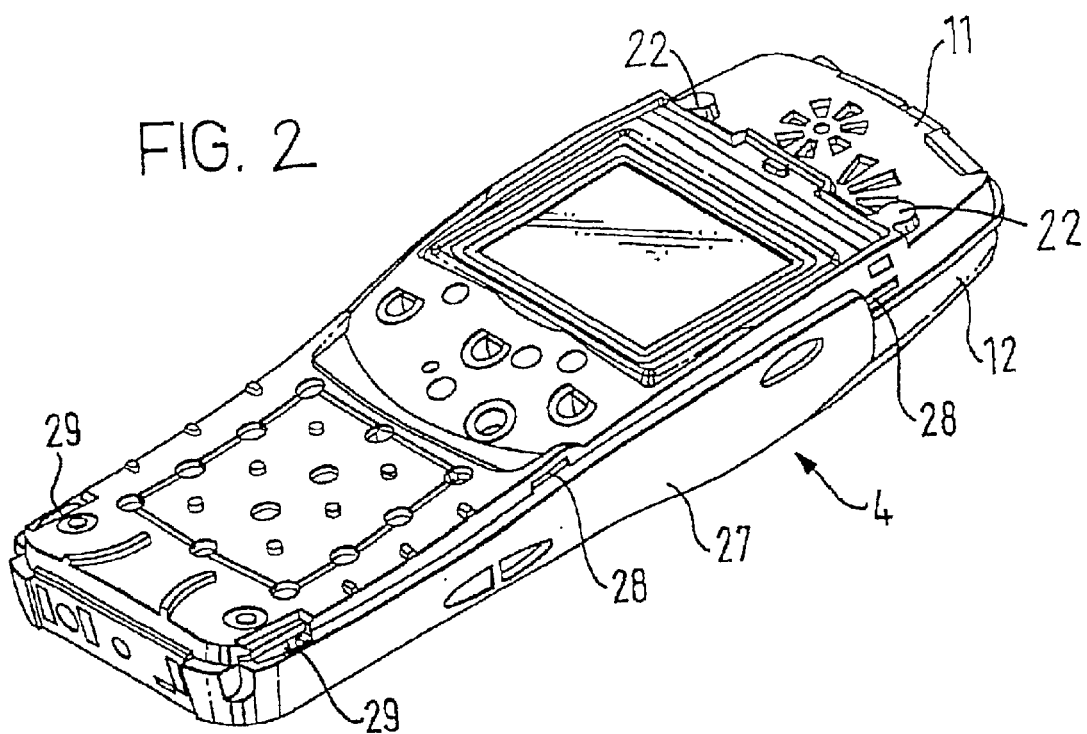
FIG. 2 is a perspective view of the upper side of a portable radio communication device of an embodiment of the present invention.

When a new removable cover is installed onto the phone and secured in position, the memory chip patches of the removable housing cover are brought into registration with a sensor in the form of a reader, indicated at reference numerals 22 in FIG. 2, provided in the phone. This reader detects the memory chip patches of the removable housing cover and proceeds to read data from it. In other words, an analog or digital input (provided by the distinguishing identity feature) is provided to allow for sensing (done by the reader) the cover that has been attached to the phone.

In this embodiment, the reader reads the memory chip carrying the distinguishing identity feature and certain predefined parameters of the removable housing cover, and transfers this data to a controller/processor of the mobile phone. This transfer of data leads to the operating characteristics of the phone being altered in agreement with the distinguishing identity feature of the removable housing cover. By operating characteristics is meant aspects of the phone relating primarily, but not exclusively, to its set-up such as ring tones, stand-by and wake-up animations, etc. These include, in a non-limiting way, the following:

1. Ring tones and musical alerts.

For example, changing the cover causes a change in the available ring-tones or audible alerts.

2. Animations/screen savers.

For example, changing the cover causes a change in the available graphics that may be displayed on the phone's display.

3. Mode (manner, bag, etc).

For example, changing the cover causes the phone to enter into silent mode, setting vibration alert only.

4. Bookmarks, browser preferences.

For example, changing the cover causes a change in the bookmark settings associated with the phone's browser services.

5. Phone memory preferences.

For example, changing the cover changes the available electronic telephone directory.

6. Games or game elements, levels, more players, replenishment of consumable items (e.g. bullets etc).

In this way, the removable cover configures selected aspects of the phone's internal operating (or behavioural) characteristics to support the external visual/mechanical characteristics. With changing removable covers, so the internal configurations may be changed.

Other forms that could be taken by the distinguishing identity feature, and associated methods for sensing of the cover identity include, in a non limiting way, the following:

1. Mechanical pegs provided on the inner surface of the removable cover extending therefrom. The pegs in use cause pressing on a switch provided on the phone surface such that the presence or absence of each peg allows for predetermined cover options. For instance a single peg on a cover that presses on a switch could give two types of cover/phone configuration. Similarly, two pegs could afford four types of configurations.

2. Resistance sensor provided on the removable cover in association with a potential divider on the phone fed to analog to digital conversion input.

3. Optical sensor provided on the phone that detects the reflectivity, or material density, or translucence of variable pegs provided on the removable cover of variable width/thickness/reflectivity pegs.

4. Magnetic sensor on the phone measuring the field strength/direction of a corresponding magnetic identity feature provided on the removable cover.

5. Silicon memory or processor chip that is provided on the removable cover and read at power-on only, and then power-off so that there is no detrimental impact on standby time.

6. Holographic identity feature on the removable cover and a holographic reader on the phone.

Each of the examples given above inherently has different levels of complexity and capability.

Furthermore, there are a number of different ways the present invention provides for enabling different internal configurations (i.e. operating characteristics) for the mobile phone.

In one arrangement, the mobile phone may be provided with a plurality of pre-stored internal configurations already included in the phone. This pre-storing could be carried out and fixed by the phone manufacturer. When a particular removable cover is attached to the phone, the distinguishing identity feature is read from the removable cover and a corresponding one of the pre-stored internal configurations is selected from the plurality of pre-stored internal configurations already included in the phone. In other words, the affixing of a chosen removable cover to the phone enables the selection of the related internal configuration from the pre-stored catalogue of internal configurations already included in the phone. In such an arrangement, there is an identifiable and enabling pre-determined link between the distinguishing identity feature and the corresponding pre-stored internal configurations.

Alternatively, the internal configurations could be pre-stored at phone manufacture and be selectable by a user to fit with a particular cover combination. With the removable cover in place on the phone, the user could select, using menu driven options, from a range of pre-programmed internal configurations internal configurations which internal configuration he/she would like to be used in conjunction with the particular removable cover in place.

In an advantageous embodiment, the operating characteristics or at any rate, the requisite change in the operating characteristics may be provided as part of the distinguishing identity feature itself. So in the embodiment in which the distinguishing identity feature is in the form of an electronic chip, the way in which the operating characteristics of the phone is to be modified is embedded as instructions in the distinguishing identity feature (e.g. by being programmed into it). In this way, when the removable housing cover is mounted on the phone, the identity sensor reads the distinguishing identity feature, more specifically, it reads the embedded instructions from the distinguishing identity feature and on this basis provides a signal to the processor for a change in the phone's operating characteristics. In other words, the instructions for changing the phone's operating characteristics are provided on, and taken directly from, the removable cover itself.

In another arrangement, the internal configurations could be retrieved/downloaded from a remote server/network such as an internet website. In this arrangement, the distinguishing identity feature is read from the cover, processed in the processor, and an indication is transmitted to the associated internet website to enable downloading of content therefrom. In response, the internet website downloads to the mobile phone a new internal configuration associated with the removable cover. (i.e. when the user changes the removal cover an auto download is executed, using for example WAP, to provide a new internal configuration to go with that particular removable cover that has been attached). In this arrangement, the steps of reading and transferring data between the removable cover and the phone is instructed by the internet website. The arrangement could be such that the cover identity allows new configurations to be pushed to the phone from the internet website as and when such configurations become available at the website, for example, even on a daily basis. Downloading could be from a server of the phone manufacturer, or from a server of a third party, such as an operator or content provider, who supplies the removable cover in question. As well as wireless downloads, content, including phone operating characteristics may be downloaded to the phone in a wired environment, by for instance connecting the phone to a computer and downloading content from the internet via the computer.

So in the example previously given of the musical band, the attachment of a removable cover relating to the musical band may enable the user access to the band's website, maybe for music downloads, band graphics and logos and news about the band.

It is thus apparent that, based on the removable cover in situ on the mobile phone, the invention extends to allowing the downloading of content from a server. The removable housing cover in this context thus serves to act as a form of hardware, interchangeable in relation to the mobile phone, for authorizing downloading of content from a server.

In a still further embodiment, the operating characteristics of the phone are determined by predefined "Profiles" options. "Profiles" define a group of operating characteristics linked to a given mode or environment in which the mobile phone is to be used. For example, in an "Meetings Profile" the mobile phone could be set to a low volume ring tone or vibration alert only, in case the user is participating in a meeting and doesn't wish to interrupt the meeting, but would like to be made aware of any incoming calls. In contrast, in a "Home Profile" the mobile phone could be set to a ring tone volume that is audible from another room. Other modes could be related to other environments in which the phone may be used, for instance "Silent Profile" may be advantageous for use in a theatre or cinema.

In this embodiment, the removable cover of the present invention is associated with the desired Profile. That is to say, different Profiles would be linked to different removable covers. For example, for out-of-doors use there may a Profiles setting called "Outside" and this Profile could be associated with, for instance, a bright coloured cover so that when the bright coloured cover is placed onto the mobile phone the "Outside" Profile is selected. Associated with the "Outside" cover may a mobile phone set up which includes a high volume ringing tone and the diversion of company calls (defined via e.g. Caller Groups) to the user's mailbox. Accordingly, when the bright coloured cover is attached to the mobile phone the user immediately recognises that the "Outside Profile" is enabled on the mobile phone. Alternatively, a dark coloured cover could be used to signify an "Office" profile for Office use and thus when placed on the mobile phone enables a phone set up that initiates "Office Profile" which enables a low volume ringing tone and the diversion of private calls (again e.g. by Caller Group definition) automatically to the user's mail box.

Hence, by means of this embodiment the user can quickly and conveniently change the Profiles setting of his/her mobile phone. Also, the user at any time just by looking at the mobile phone knows immediately which Profile setting is currently activated without the need to check the display or navigate through the phones menu options.

The different Profiles' removable cases may be provided with unique respective mechanical switch actuators that when mounted on the mobile phone operate to close unique combinations of switches embodying the sensor provided on the phone. In this way, different Profiles are activated depending on the different switching positions. Alternatively, a memory chip could be integrated into removable cover, the chip carrying data relating to a Profiles Setting, which on mounting on the phone could be read by a phone's sensor and installed onto the phone.

Of course, menu changing of Profiles should also be possible despite the presence of a particular Profiles cover. In other words, the user should be still able to change the profile manually when he/she does not have to hand a particular desired phone cover for the particular situation.

Embodiments of the present invention has application in a wide range of products and services such as corporate branding for example in e-commerce, e-banking, music distribution, product promotion etc. Additionally, the removable covers could encompass themes include seasonal covers or event covers. Game covers could be easily snapped on by the user which for instance automatically sets up the installation of a new game on the mobile phone/handset, or offers replenishments, or authorises the downloading of games related features from a server of the games developer.

Accordingly, the present invention may be embodied in other specific forms without departing from its essential attributes. Reference should thus be made to the appended claims and other general statements herein rather than to the foregoing description as indicating the scope of invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalization thereof irrespective of whether or not it relates to the claimed invention or mitigates any or all of the problems addressed.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

Applicant defines "a," "an," "plurality" to possibly mean one or more.

What is claimed is:

1. An user-exchangable housing cover adapted to be detachably connectable to a portable radio communication device with a plurality of operating characteristics, the user-exchangable housing cover comprising:
   an identity means for identification of the user-exchangable cover, the identity means including readable data store in a memory thereof;
   an attaching/detaching means for removably attaching and detaching the cover to the portable radio communication device by an user of the portable radio communication device; and
   the portable radio communication device comprising:
   a sensor for sensing the identity means of the user-exchangable cover; and
   a processor for controlling the operating characteristics of the device, the arrangement being such that in use the user-exchangable housing, cover can be mounted on and dismounted from the portable radio communication device by using the attachment and detachment means of the removable housing cover, and in the condition when the user-exchangable cover is mounted on the portable radio communication device the sensor senses the presence of the identity means, reads readable data from the identity means and outputs data based on the readable to the processor, wherein the processor is responsive to readable data so as to change selected ones of the operating characteristics of the portable radio communication device in order to allow the user to customize the radio communication device.

2. An user-exchangable housing cover according to claim 1, wherein the readable data stored on the identity means comprises a plurality of pre-defined and pre-stored operating characteristic configurations for the portable radio communication device, and the sensor reads said readable data so as to download operating characteristic configurations therefrom, whereby the downloaded operating characteristic configuration causes the processor to change the operating characteristics of the portable radio communication device by using one or more of the plurality of said downloaded operating characteristic configurations.

3. An user-exchangable housing cover according to claim 1, wherein the identity means allows the portable radio communication device to access a pre-determined server or network and to download therefrom data comprising operating characteristic configurations for the portable radio communication device by providing an address to the server from which the data comprising operation characteristic configurations may be downloaded without the user manually entering the address.

4. An user-exchangable housing cover according to claim 3, wherein the pre-determined server or network corresponds to an internet website.

5. An user-exchangable housing cover according to claim 1 or 2, wherein the identity means comprises a memory or processor chip and the sensor comprises a reader for reading said memory or processor chip.

6. An user-exchangable housing cover according to claim 1, wherein the operating characteristics of the portable radio communication device comprise one or more of:
   ring tones and/or musical alerts;
   animations/screen savers;
   mode;
   bookmarks and/or browser preferences;
   phone memory preferences;
   games and/or game elements;
   UI screen colours and/or UI style;
   input method;
   audio set-up;
   default messages;
   display language;
   agents and/or agent set-up;
   security keys;
   push message filters and/or accounts;
   enabling of set-up and/or configuration settings;
   sensor weighting;
   outgoing call restrictions.

7. An user-exchangable housing cover for a portable radio communication device with a sensor, the housing cover comprising;
   an attaching means for removably attaching the cover to the portable radio communication device by an user of the portable radio communication device; and an identity means comprising readable data stored In memory thereof, the user-exchangable housing cover being so configured that when the housing cover is mounted on the portable radio communication device, the identity means is coupled with the sensor of the portable radio communication, and the sensor reads the readable data from the identity means wherein the internal functionality of the portable radio communication device is dependent on the identity means allowing user to customize the portable radio communication device.

8. An user-exchangable housing cover according to claim 1, wherein the user-exchangable cover carries indicia and graphics thereon, and the user-exchangable housing cover covers all or a part of the radio communication device.

9. A portable radio communication device having an user-exchangable housing cover, the portable radio communication device comprising:

a sensor for reading data from the user-exchangable housing cover; and a processor for controlling the operating characteristics of the device, and the user-exchangable housing cover comprising an identity means including readable data stored in a memory thereof and attachment and detachment means, wherein the user-exchangable housing cover being configured to be mounted on and removably attached to the portable radio communication device by the user of the portable radio communication device using the user attachment and detachment means, in which arrangement the sensor of the portable radio communication device is operable to read the readable data of the identity means of the user-exchangable housing cover and provide an input to the processor based on the readable data of the identity means, such that the processor is controlled to alter one or more of the operating characteristics in accordance with the readable data of the identity means.

* * * * *